(12) United States Patent
Song

(10) Patent No.: US 10,424,982 B2
(45) Date of Patent: Sep. 24, 2019

(54) INNER ROTOR TYPE ELECTRIC MOTOR

(71) Applicant: Komotek Co., Ltd., Seongnam-si (KR)

(72) Inventor: Yun Yong Song, Seongnam-si (KR)

(73) Assignee: Komotek Co., Ltd., Seongnam-si (KR)

( * ) Notice: Subject to any disclaimer, the term of this patent is extended or adjusted under 35 U.S.C. 154(b) by 876 days.

(21) Appl. No.: 14/767,978

(22) PCT Filed: Feb. 19, 2014

(86) PCT No.: PCT/KR2014/001331
§ 371 (c)(1),
(2) Date: Aug. 14, 2015

(87) PCT Pub. No.: WO2014/129791
PCT Pub. Date: Aug. 28, 2014

(65) Prior Publication Data
US 2015/0380997 A1    Dec. 31, 2015

(30) Foreign Application Priority Data

Feb. 19, 2013    (KR) .................. 10-2013-0017579

(51) Int. Cl.
*H02K 1/27*    (2006.01)
*H02K 15/03*    (2006.01)
*H02K 1/28*    (2006.01)

(52) U.S. Cl.
CPC ......... *H02K 1/2773* (2013.01); *H02K 1/2786* (2013.01); *H02K 1/28* (2013.01); *H02K 15/03* (2013.01); *H02K 2201/06* (2013.01); *H02K 2213/03* (2013.01)

(58) Field of Classification Search
CPC ...... H02K 1/2773; H02K 1/2786; H02K 1/28; H02K 15/03; H02K 2201/06; H02K 2213/03
USPC .................. 310/156.08, 156.55, 156.56
See application file for complete search history.

(56) References Cited

U.S. PATENT DOCUMENTS

| | | | |
|---|---|---|---|
| 5,292,284 A * | 3/1994 | Denk | H02K 49/106 310/104 |
| 5,452,590 A | 9/1995 | Vigili | |
| 8,018,110 B2 | 9/2011 | Alexander et al. | |
| 2006/0061227 A1 * | 3/2006 | Heideman | H02K 1/2773 310/156.56 |
| 2006/0175923 A1 * | 8/2006 | Abou Akar | H02K 1/278 310/114 |

(Continued)

FOREIGN PATENT DOCUMENTS

| | | |
|---|---|---|
| KR | 1019990012774 A | 2/1999 |
| KR | 1019990065127 A | 8/1999 |

(Continued)

*Primary Examiner* — Michael Andrews
(74) *Attorney, Agent, or Firm* — The Webb Law Firm

(57) ABSTRACT

The present invention includes a rotor with rotor sectors arranged around a center along the peripheral direction and a bridge between adjacent rotor sectors for connecting the adjacent rotor sectors, so that when inserting a shaft in the center of the rotor, it can be readily and firmly connected thereto by thermal and pressed insertion, and in the rotor having core plates laid on one another, a skew structure may be readily attained by connecting the core plates laid sequentially shifted by a given angle in one direction to the shaft.

8 Claims, 12 Drawing Sheets

(56) References Cited

U.S. PATENT DOCUMENTS

| | | | | |
|---|---|---|---|---|
| 2008/0265705 A1* | 10/2008 | Kinoshita | ............ | H02K 1/2766 |
| | | | | 310/156.44 |
| 2010/0277028 A1* | 11/2010 | Alexander | ........... | H02K 1/2773 |
| | | | | 310/156.51 |
| 2012/0062154 A1* | 3/2012 | Chiao | ...................... | H02K 3/47 |
| | | | | 318/161 |

FOREIGN PATENT DOCUMENTS

| KR | 1019990065920 A | 8/1999 |
|---|---|---|
| KR | 1020080082390 A | 9/2008 |

* cited by examiner

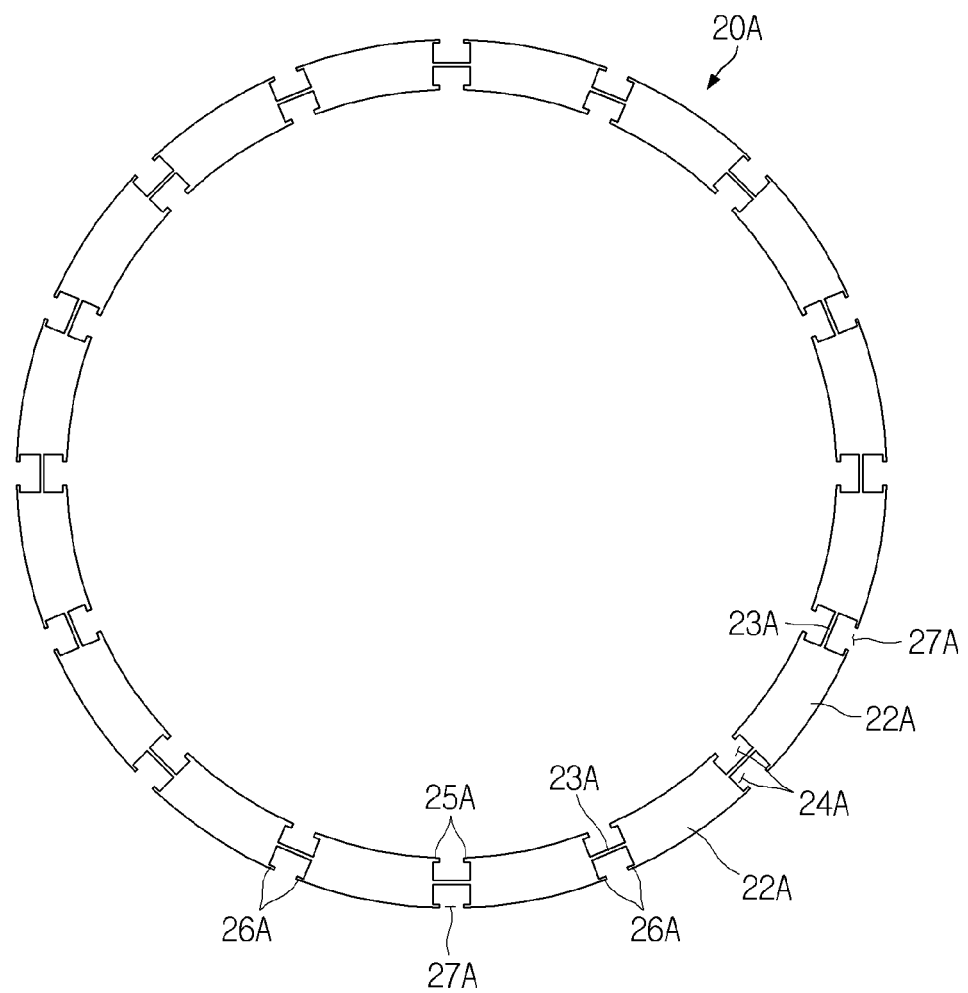

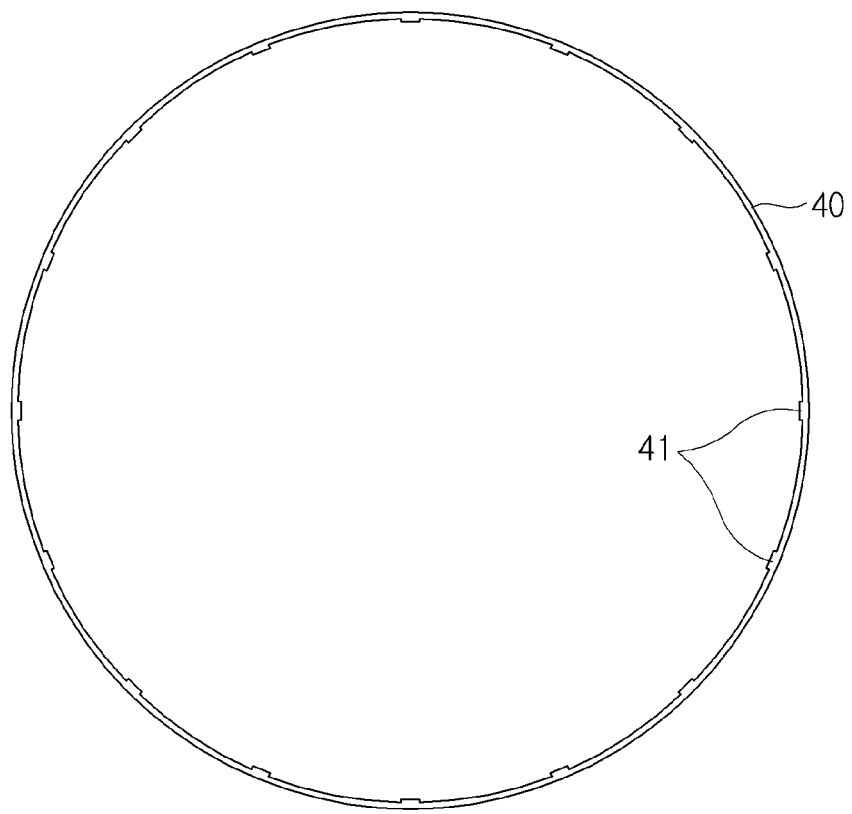

INNER ROTOR TYPE ELECTRIC MOTOR

CROSS-REFERENCE TO RELATED APPLICATIONS

This application is the United States national phase of international Application No. PCT/KR2014/001331 filed Feb. 19, 2014, and claims priority to Korean Patent Application No. 10-2013-0017579 filed Feb. 19, 2013, the disclosures of which are hereby incorporated in their entirety by reference.

TECHNICAL FIELD

The present invention relates to an inner rotor type or outer rotor type electric motor, and a method of manufacturing the electric motor.

BACKGROUND ART

In general, an electric motor includes a stator and a rotor that rotates relative to the stator, and a coil is wound around the stator and a permanent magnet is disposed in the rotor. In accordance with the arrangement relationship between a stator and a rotor, electric motors can fall into an inner rotor type in which a rotor is disposed inside a stator and an outer rotor type in which a rotor is disposed outside a stator. Further, in accordance with the arrangement structure of a permanent structure with respect to a rotor, the electric motors can be classified into an SPM (Surface Permanent Magnet) type in which a permanent magnet is attached to the surface of a rotor and an IPM (Interior Permanent Magnet) in which a permanent magnet is impregnated in a rotor.

In an inner rotor type, a shaft connected to a load is fitted in the center (rotational center) of a rotor, but in an outer rotor type, a frame connected to a load is fitted around a rotor. When a shaft or a frame is firmly and closely combined with a rotor in order, structural stability of an electric motor can be ensured, deterioration of operational performance can be prevented, and torque can be accurately transmitted to a load. However, previous methods of combining a rotor with a shaft or a frame by fitting a shaft in a shaft insertion hole formed at the center of a rotor or fitting a cylindrical frame around a rotor, for example, force-fitting, caulking, and using fasteners are relatively inefficient and cause side effects in electric motors such as performance deterioration, so these methods are difficult to apply.

Rotation fluctuation called cogging torque is generated while an electric motor including a stator and a rotor operates. Cogging torque is one of factors that deteriorate the performance of an electric motor, causing noise or vibration. A method of removing harmonics from a frequency waveform by applying a skew structure to a rotor is used to reduce cogging torque. However, applying a skew structure to a rotor necessarily makes an assembly process difficult, so a reform measure for simplifying a skew structure and improving assembly efficiency is strongly required.

The following Patent Documents 1 and 2 have been disclosed in the related art.

Patent Document 1: Korean Patent Application Publication No. 10-1999-0065920 (Published on Aug. 16, 1999)

Patent Document 2: Korean Patent Application Publication No. 10-1999-0065127 (Published on Aug. 5, 1999)

DISCLOSURE

Technical Problem

An object of the present invention is to provide an electric motor that is advantageous in terms of manufacturing and a method of manufacturing the electric motor.

Technical Solution

According to an embodiment of the present invention, there is provided an inner rotor type electric motor that includes: a stator having a plurality of teeth that are circumferentially arranged and on which a coil, which generates a magnetic field when a current flows, is wound; a rotor disposed inside the stator to be able to rotate relative to the stator, having a plurality of permanent magnets circumferentially arranged, and having a shaft insertion hole at a center; and a non-magnetic shaft thermally force-fitted in the shaft insertion hole of the rotor, rotating with the rotor, and connected to a load, in which the rotor includes: a plurality of rotor sectors defining the shaft insertion hole by being arranged with predetermined intervals circumferentially around the center; and bridges connecting the adjacent rotor sectors to each other by being inserted at one or several positions between the rotor sectors, so the shaft insertion hole very easily increases in size when heat is applied for thermal force-fitting. The material of the rotor may be iron (Fe) and the material of the shaft may be aluminum. Further, the rotor sectors and the bridges may be integrally formed.

The bridges may divide spaces between the rotor sectors into two or more unit spaces, and the permanent magnets may be received in the unit spaces, respectively, so the unit spaces may be permanent magnet impregnation spaces.

The bridges may divide the spaces between the rotor sectors such that two or more permanent magnet impregnation spaces are radially arranged between the rotor sectors, and the rotor sectors may have inner steps and outer steps protruding and facing each other at inner ends and outer ends on both sides that are adjacent to and face each other.

One or a plurality of keys may be axially formed around an outer side of the shaft, and key grooves where the keys are fitted may be formed around an inner side of the shaft insertion hole. The spaces between the inner steps may be the key grooves.

The bridges may divide spaces between the rotor sectors such that three or more permanent magnet impregnation spaces are radially arranged, the permanent magnets may include ferrite permanent magnets impregnated in inner permanent magnet impregnation spaces between the rotor sectors and rare-earth permanent magnets impregnated in outer permanent magnet impregnation spaces, and the number of the ferrite permanent magnets is larger than the number of the rare-earth permanent magnets in the permanent magnets between the rotor sectors. The permanent magnets impregnated in the three or more permanent magnet impregnation spaces between the rotor sectors all may be the same in size.

In the inner rotor type electric motor according to an embodiment of the present invention, the rotor may include a plurality of core plates constituting a rotor core by being axially stacked, the core plates each may include a plurality of sector plates circumferentially arranged with predetermined intervals around the center and the bridges connecting the sector plates between the sector plate, and groups of the stacked sector plates may constitute the rotor sector.

A plurality of first key grooves axially formed may be arranged circumferentially with regular intervals around one of an inner sides of the core plates or the outer side of the shaft and at least one second key groove corresponding to the first key grooves may be formed on the other one, the core plates may be shifted in one direction in stacking order by circumferential gaps between the first key grooves such that the first key grooves coincide with the second key groove, and fitted on the shaft, keys may be fitted in the coinciding first key grooves and second key grooves, and the core plates may be combined with the shaft in a skew structure.

According to an embodiment of the present invention, there is provided a method of manufacturing an inner rotor type electric motor that includes: preparing a rotor including a plurality of sectors circumferentially arranged with predetermined intervals around a center and bridges connecting adjacent rotor sectors to each other between the rotor sectors, and having a shaft insertion hole at the center; and increasing a size of the shaft insertion hole by heating the prepared rotor, inserting a non-magnetic shaft into the shaft insertion hole, and then force-fitting the shaft by reducing the shaft insertion hole by cooling the rotor.

According to an embodiment of the present invention, there is provided an inner rotor type electric motor that includes: a stator having a plurality of teeth that are circumferentially arranged and on which a coil is wound; a rotor disposed inside the stator to be able to rotate relative to the stator, having a plurality of permanent magnets, and having a shaft insertion hole at a center; and a non-magnetic shaft inserted in the shaft insertion hole and rotating with the rotor, in which the rotor includes a plurality of core plates constituting a rotor core by being axially stacked, the core plates have unit insertion holes constituting the shaft insertion hole, and the permanent magnets are circumferentially arranged around the unit insertion holes, a plurality of axially formed first key grooves is arranged circumferentially with regular intervals around one of an inner sides of the core plates or the outer side of the shaft and at least one second key groove corresponding to the first key grooves is formed on the other one, the core plates are shifted in one direction in stacking order by circumferential gaps between the first key grooves such that the first key grooves coincide with the second key groove, and fitted on the shaft, and keys are fitted in the coinciding first key grooves and second key grooves and the core plates are combined with the shaft in a skew structure.

According to an embodiment of the present invention, there is provided a method of manufacturing an inner rotor type electric motor that includes: preparing a plurality of core plates constituting a rotor core by being stacked, each having a unit insertion hole constituting a shaft insertion hole coinciding with each other in stacking, and each having a plurality of first key grooves formed axially in an inner side and arranged circumferentially with regular intervals; preparing a non-magnetic shaft having at least one second key grooves corresponding to the first key grooves on an outer side; and combining the core plates with the shaft in a skew structure by fitting and stacking the prepared core plates on the prepared shaft such that the first key grooves coincide with the second key groove, that is, by fitting keys into the coinciding first key grooves and second grooves such that the core plates are shifted in one direction in stacking order by circumferential gaps of the first key grooves.

According to an embodiment of the present invention, there is provided an outer rotor type electric motor that includes: a stator having a plurality of teeth that are circumferentially arranged and on which a coil is wound; a rotor disposed outside the stator to be able to rotate relative to the stator and having a plurality of permanent magnets circumferentially arranged thereon; and a circular non-magnetic frame thermally force-fitted on an outer side of the rotor and rotating with the rotor (the frame may be made of aluminum), in which the rotor includes: a plurality of rotor sectors arranged with predetermined intervals circumferentially around an outer side of the stator; and bridges connecting adjacent rotor sectors to each other by being disposed at one or several positions between the rotor sectors and dividing spaces between the rotor sectors into two or more unit spaces where the permanent magnets are impregnated, and an inner circumference of the frame is increased, when heat is applied in order to thermally force-fit the frame on the rotor.

In the outer rotor type electric motor, the bridges may divide spaces between the rotor sectors such that three or more unit spaces are radially arranged, the permanent magnets may include ferrite permanent magnets impregnated in outer unit spaces between the rotor sectors and rare-earth permanent magnets impregnated in inner unit spaces, and the number of the ferrite permanent magnets is larger than the number of the rare-earth permanent magnets in the permanent magnets between the rotor sectors. The permanent magnets impregnated in the three or more unit spaces between the rotor sectors all may be the same in size.

According to an embodiment of the present invention, there is provided an outer rotor type electric motor that includes: a stator having a plurality of teeth that are circumferentially arranged and on which a coil is wound; a rotor disposed outside the stator to be able to rotate relative to the stator and having a plurality of permanent magnets; and a non-magnetic shaft fitted on an outer side of the rotor and rotating with the rotor, in which the rotor includes a plurality of core plates constituting a rotor core by being axially stacked, the permanent magnets are circumferentially arranged in each of the core plates, a plurality of axially formed first key grooves is arranged circumferentially with regular intervals around one of outer sides of the core plates or an inner side of the frame and at least one second key groove corresponding to the first key grooves is formed on the other one, the core plates are shifted in one direction in stacking order by circumferential gaps between the first key grooves such that the first key grooves coincide with the second key groove and are fitted in the frame, and keys are fitted in the coinciding first key grooves and second key grooves and the core plates are combined with the frame in a skew structure.

In the outer rotor type electric motor having the skew structure, the first key grooves may be formed such that at least one is positioned between the permanent magnets circumferentially arranged in the core plates.

According to an embodiment of the present invention, there is provided a method of manufacturing an outer rotor type electric motor that includes: preparing a plurality of core plates constituting a rotor core by being stacked and each having a plurality of first key grooves formed axially in an outer side and arranged circumferentially with regular intervals; preparing a non-magnetic frame having at least one second key grooves corresponding to the first key grooves on an inner side; and combining the core plates with the frame in a skew structure by fitting and stacking the prepared core plates inside the prepared frame such that the first key grooves coincide with the second key groove, that is, by fitting keys into the coinciding first key grooves and second grooves such that the core plates are shifted in one direction in stacking order by circumferential gaps of the first key grooves.

Advantageous Effects

According to embodiments of the present invention, it is possible to easily assembly an electric motor, including combining of a rotor with a shaft, and to easily achieve a skew structure.

DESCRIPTION OF DRAWINGS

FIG. 5 is a view showing a rotor shown in FIG. 4.

FIG. 6 is a view showing a frame shown in FIG. 4.

MODE FOR INVENTION

Hereinafter, preferred embodiments of the present invention will be described with reference to accompanying drawings.

Figure 1:
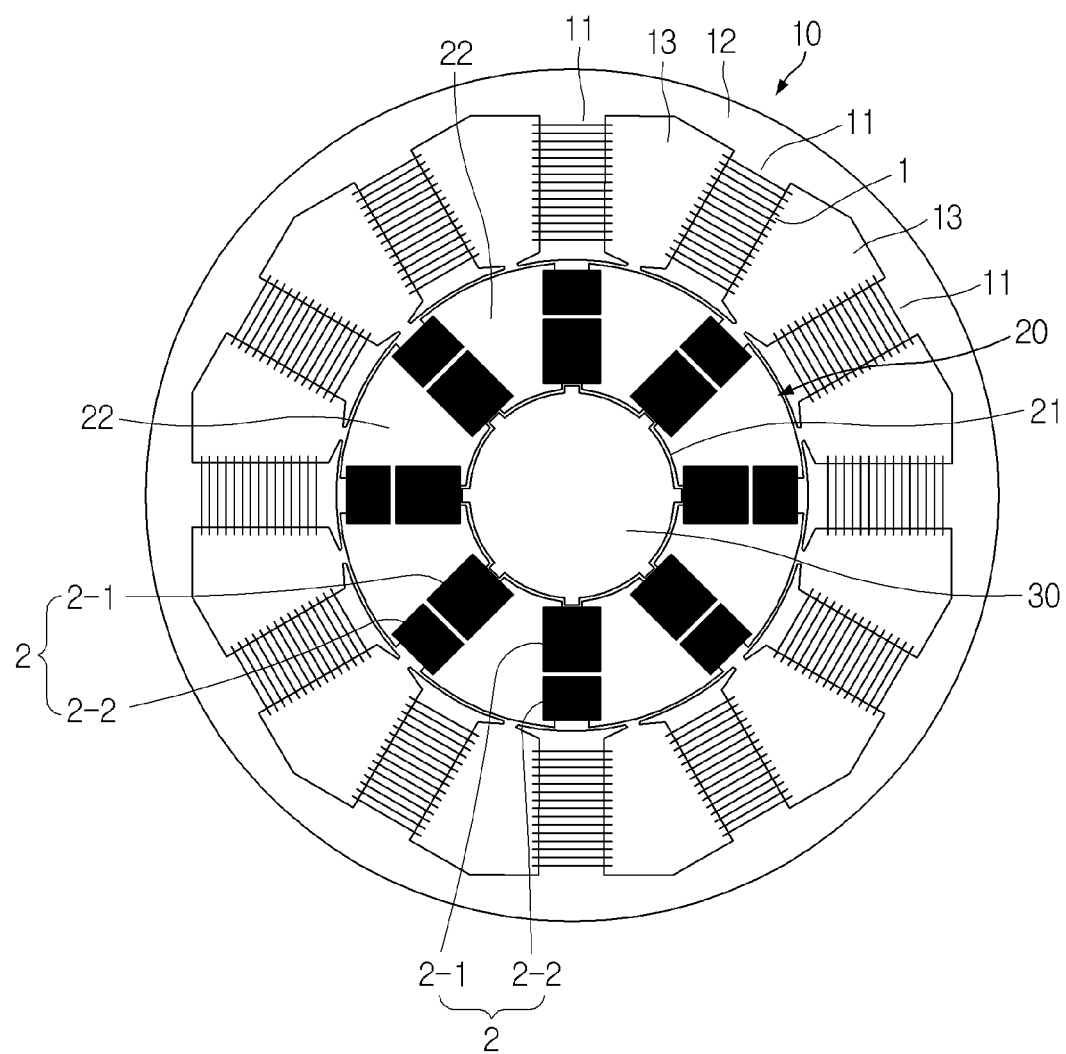
FIG. 1 is a view showing an electric motor according to a first embodiment of the present invention.
Figure 2:
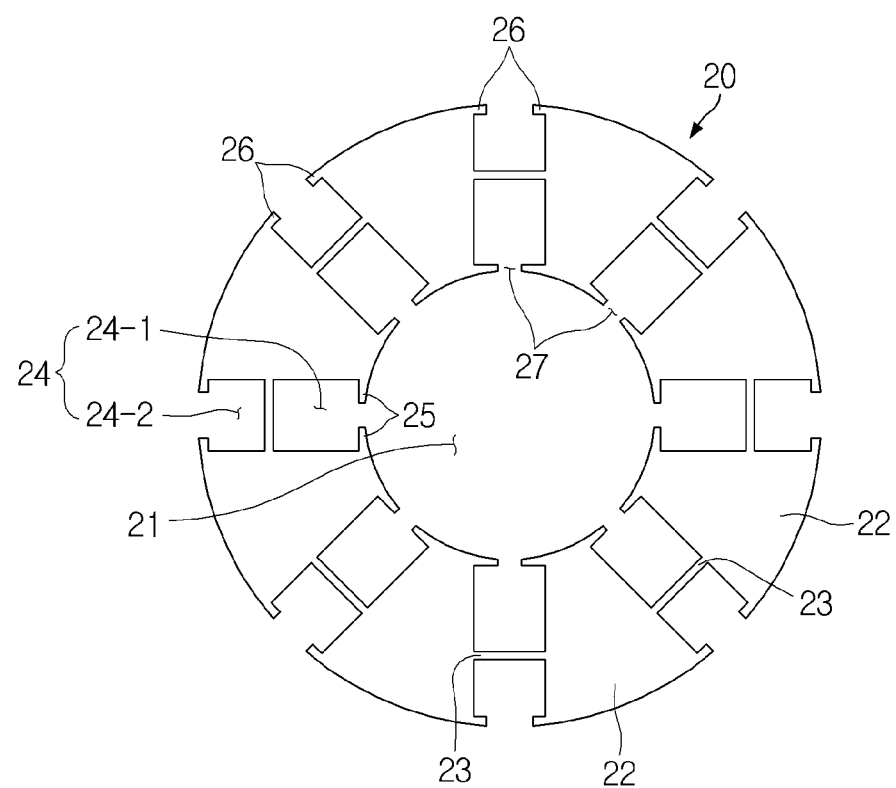
FIG. 2 is a view showing a rotor shown in FIG. 1.
Figure 3:
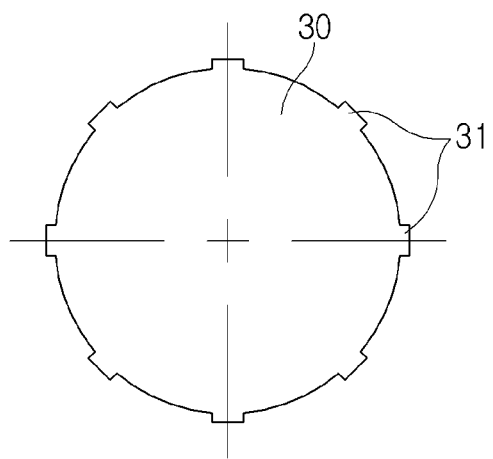
FIG. 3 is a view showing a shaft shown in FIG. 1.

FIG. 1 is a view showing an electric motor according to a first embodiment of the present invention, which is an inner rotor type electric motor in which a rotor 20 having a circular structure is disposed inside a stator 10 and a non-magnetic shaft 30 is combined with the rotor 20. FIG. 2 shows the rotor 20 shown in FIG. 1, and FIG. 3 shows the shaft 30 shown in FIG. 1.

As shown in FIG. 1, the stator 10 has a plurality of teeth 11 on which a coil 1 is wound. The teeth 11 are radially disposed and circumferentially arranged, and connected by a ring-shaped yoke 12. The teeth 11 protrude toward the center from the inner side of the yoke 12 and their free ends may expand to prevent separation of the coils 1. A reference numeral '13' indicates slots between the teeth 11 that are circumferentially spaced from each other.

The rotor 20 is disposed inside the stator 10 to be able to rotate relative to the stator and has a circular shaft insertion hole 21 where the shaft 30 is fitted. Referring to FIGS. 1 and 2, the rotor 20 has a structure in which when heat at a predetermined temperature is applied, the shaft insertion hole 21 can easily increase in size. To this end, the rotor 20 includes: a plurality of rotor sectors 22 defining the shaft insertion hole at the center by being circumferentially arranged with regular intervals around the center; and bridges 23 connecting adjacent rotor sectors 22 by being inserted at one or several positions between the rotor sectors 22. The rotor sectors 22 may be formed in a fan shape. The rotor sectors 22 and the bridges 23 may be formed in a single unit.

The shaft 30 is connected to a load. The material of the shaft 30 may be stainless steel or aluminum. The shaft 30 is combined with the rotor 20 by thermal forcible-fitting and rotates with the rotor 20. The process of thermal forcible-fitting is as follows.

The inner circumference of the shaft insertion hole 21 is formed slightly smaller than the outer circumference of the shaft 30. The inner circumference of the shaft insertion hole 21 may be 0.50~1.00 mm smaller than the outer circumference of the shaft 30. Obviously, it is difficult or impossible to fit the shaft 30 into the shaft insertion hole 21 in this state. When the rotor 20 is heated at a predetermined temperature, it is divided into the rotor sectors 22 and the shaft insertion hole 21 is easily expanded for the structural feature of the rotor 20 in which the divided rotor sectors 22 are connected to each other by the bridges 23.

Accordingly, the shaft insertion hole 21 is expanded such that the inner circumference of the shaft insertion hole 21 becomes larger than the outer circumference of the shaft 30 by heating the rotor 20. Next, the shaft 30 is inserted into the shaft insertion hole 21 with the increased inner circumference and then cooled. Accordingly, the shaft insertion hole 21 contracts to the initial state and the shaft 30 is firmly and closely combined with the rotor 20 by being force-fitted in the contracting shaft insertion hole 21. For cooling the rotor 20, forcible cooling using air or water, or common natural cooling may be used.

As shown in FIGS. 1 and 2, the bridges 23 divide the spaces between the adjacent rotor sectors 22 into a plurality of unit spaces 24 and a permanent magnet 2 is impregnated in each of the divided unit spaces 24, so the unit spaces 24 function as a spaces for impregnating permanent magnets.

In detail, the bridges 23 divide the spaces between the rotor sectors 22 such that a plurality of permanent magnet impregnation spaces 24 is arranged radially in lines between the rotor sectors 22. Accordingly, the permanent magnets 2 can be arranged radially around the center of the rotor 20 (shaft insertion hole) in the entire formation. A ferrite permanent magnet 2-1 and a rare-earth permanent magnet 2-2 may be used for the permanent magnets 2. The ferrite permanent magnet 2-1 may be barium (Ba) ferrite permanent magnet or a strontium (Sr) ferrite permanent magnet, and the rare-earth permanent magnet 2-2 may be a neodymium (Nd) ferrite permanent magnet or a samarium (Sm)-cobalt (Co) permanent magnet.

FIGS. 1 and 2 show an example in which the spaces between the rotor sectors 22 are each divided into two permanent magnet impregnation spaces 24.

In this configuration, in two permanent magnet impregnation spaces 24 radially disposed between the rotor sectors 22, the ferrite permanent magnet 2-1 may be impregnated in the inner permanent magnet impregnation space 24-1 and the rare-earth permanent magnet 2-2 may be impregnated in the outer permanent magnet impregnation space 24-2. Further, in two permanent magnet impregnation spaces between the rotor sectors 22, the inner permanent magnet impregnation space 24-1 is larger in size than the outer permanent magnet impregnation space 24-2, so the ferrite permanent magnet 2-1 may also be larger in size than the rare-earth permanent magnet 2-2.

In an IPM (Interior Permanent Magnet) type electric motor in which permanent magnets are impregnated in a rotor, an influence due to an armature reaction is large and permanent magnets impregnated close to a rotor are more vulnerable to irreversible demagnetization at the portions of a rotor which are close to the stator (outside a rotor in an inner rotor type and inside a rotor in an outer rotor type). It may be possible to remove some of permanent magnets close to a stator in order to prevent irreversible demagnetization, but in this case, the magnetic flux of the permanent magnets reduces and the output decreases accordingly.

However, as described above, when the rare-earth permanent magnet 2-2 at the outer side is made smaller in size than the ferrite permanent magnet 2-1 at the inner side in two permanent magnets impregnated between the rotor sectors 22 (that is, when a rare-earth permanent magnet smaller in size than a ferrite permanent magnet to be impregnated in the inner side is impregnated in the outer side), it is possible to prevent irreversible demagnetization due to an armature reaction and to compensate for output of an electric motor.

Though not shown in detail, preventing irreversible demagnetization and compensating for output of an electric motor can be achieved by providing three or more permanent magnet impregnation spaces 24 to be disposed radially between the rotor sectors 22, making the three or more permanent magnet impregnation spaces 24 between the rotor sectors 22 in the same size, making the permanent magnets 2 to be impregnated in the permanent magnet impregnation spaces 24 in the same size, impregnating the ferrite permanent magnet 2-1 in the inner permanent magnet impregnation spaces of the three or more permanent magnet impregnation spaces 24 between the rotor sectors 22, impregnating the rare-earth permanent magnet 2-2 in the outer permanent magnet impregnation spaces, and providing more ferrite permanent magnets 2-1 than rare-earth permanent magnets 2-2. For example, it may be possible to prepare five permanent magnet impregnation spaces 24, impregnate the ferrite permanent magnet 2-1 in three permanent magnet impregnation spaces sequentially from the inside, and impregnate the rare-earth permanent magnets 2-2 in the other two outer permanent magnet impregnation spaces.

Referring to FIG. 2, the rotor sectors 22 have inner steps 25 protruding and facing each other with a predetermined gap therebetween, at inner ends on both sides adjacent to and facing each other, and outer steps 26 protruding and facing each other with a predetermined gap therebetween, at outer ends on both sides adjacent and facing each other. By the inner steps 25 and the outer steps 26, the permanent magnets 2 impregnated in the permanent magnet impregnation spaces 24 cannot be separated radially.

Referring to FIGS. 1 to 3, one or a plurality of keys 31 is formed axially (in the longitudinal direction of the shaft) around the outer side of the shaft 30 and key grooves 27 where the keys 31 are fitted are formed around the inner side of the shaft insertion hole 21. As shown in FIG. 2, in the first embodiment, adjacent inner steps 25 face each other with a predetermined gap therebetween, so the spaces between the adjacent inner steps 25 function as the key grooves 27. The shaft 30 may have a plurality of keys 31 that are fitted in the key grooves 27, respectively.

The key grooves 27 are slightly smaller in size than the keys 31, so when the shaft 30 is thermally forcibly-fitted, the keys 31 are inserted in the key grooves 27 and firmly and closely fitted in the key grooves 27.

Figure 4:
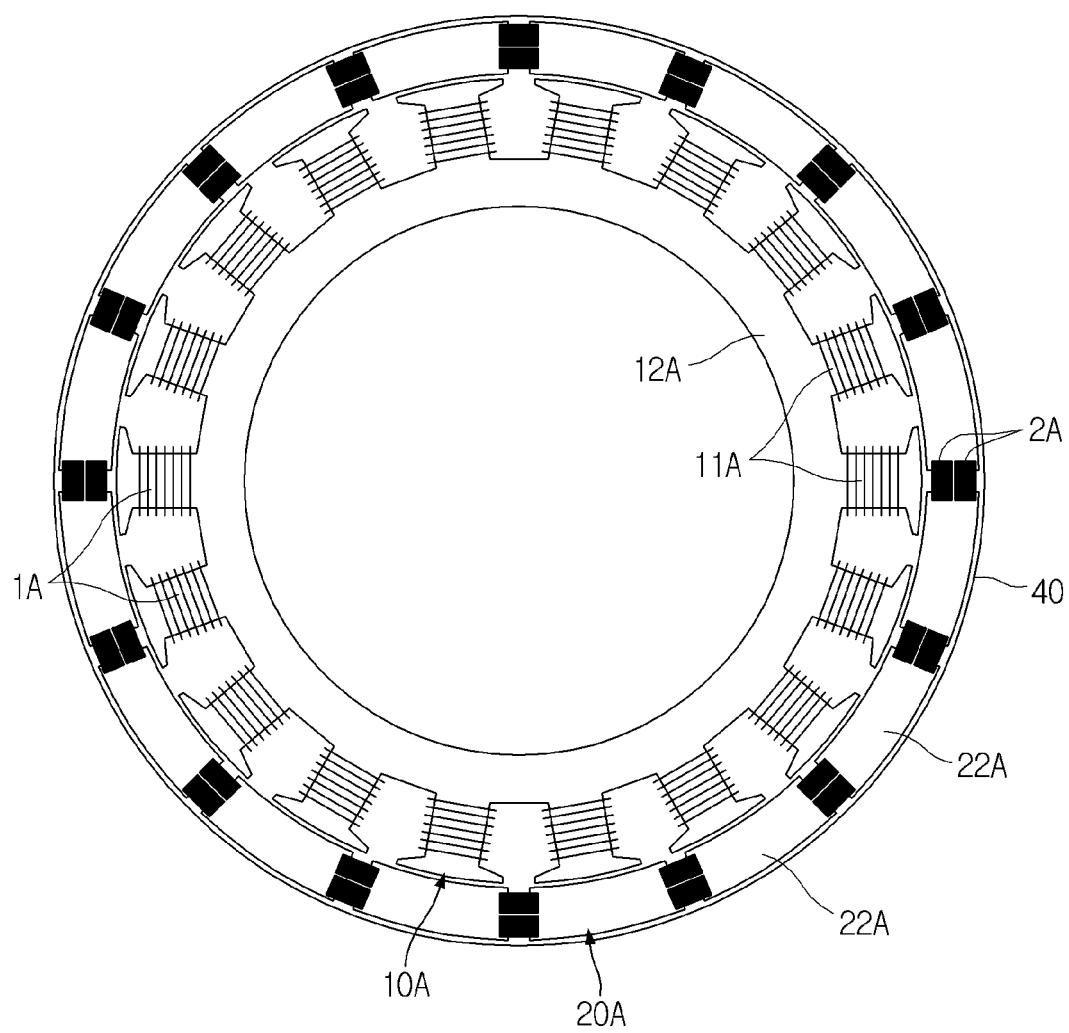
FIG. 4 is a view showing an electric motor according to a second embodiment of the present invention.
Figure 7A:
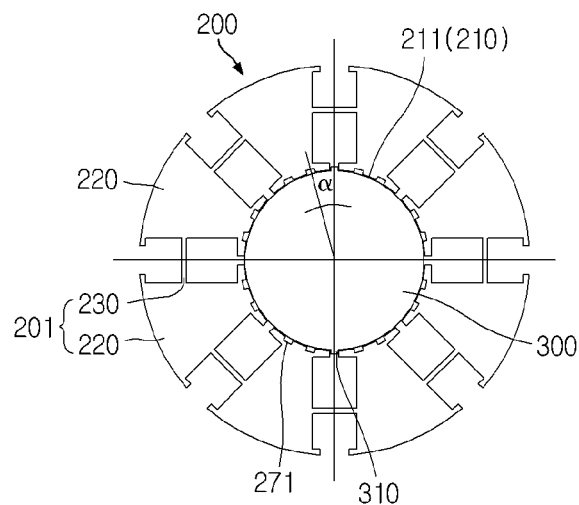
FIGS. 7a to 7d are views showing main parts of an electric motor according to a third embodiment of the present invention.
Figure 7B:
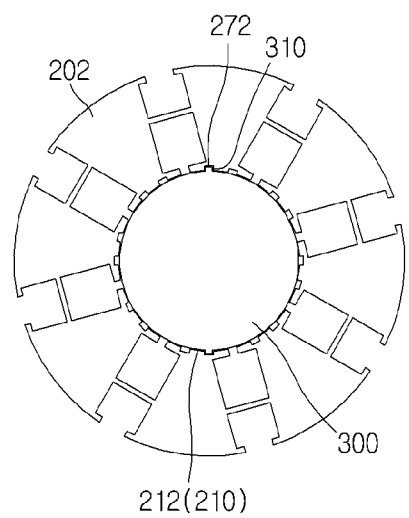
Figure 7C:
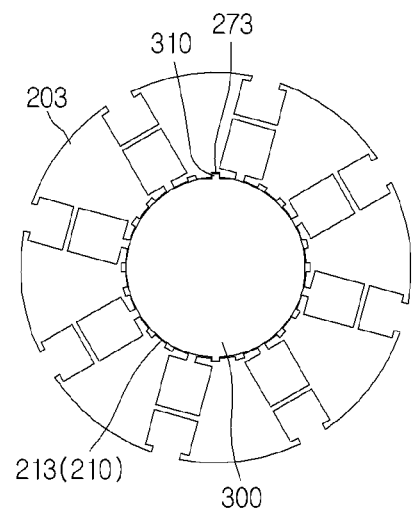
Figure 7D:
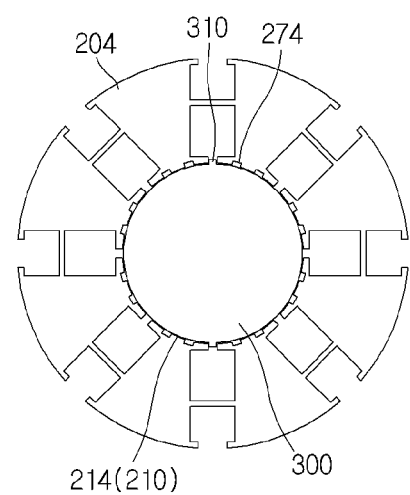
Figure 8:
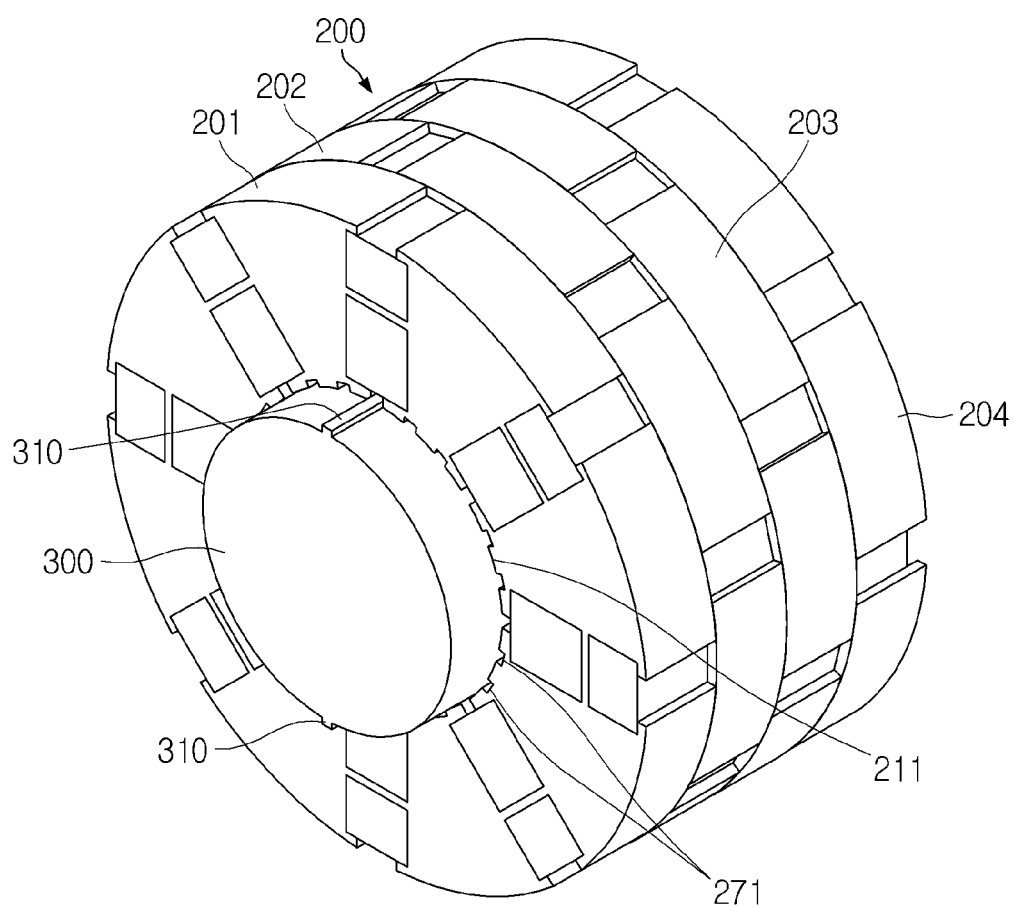
FIG. 8 is a perspective view showing the main parts of the electric motor according to the third embodiment of the present invention.

FIG. 4 is a view showing an electric motor according to a second embodiment of the present invention, which is an outer rotor type electric motor in which a circular rotor 20A is disposed outside a stator 10A and a non-magnetic frame 40 is fitted around the rotor 20A by thermal forcible-fitting. FIG. 5 shows the rotor 20A shown in FIG. 4, and FIG. 6 shows the frame 40 shown in FIG. 4.

As shown in FIG. 4, the stator 10A has a plurality of teeth 11A disposed radially around a ring-shaped yoke 12A and circumferentially arranged. A coil 1A is wound on the teeth 11A. The stator 10A is the same as or similar to the stator 10A in the first embodiment, including the shape of the teeth 11A, so detailed description is not provided.

The rotor 20A is disposed outside the stator 10A to be able to rotate relative to the stator and the circular frame 40 connected to a load is disposed outside the rotor, so the stator does not have the shaft insertion hole 21, unlike the rotor 20 of the first embodiment. Referring to FIGS. 4 and 5, the rotor 20A, similar to the rotor 20 of the first embodiment, includes a plurality of rotor sectors 22A circumferentially arranged with regular intervals and bridges 23A disposed as at least one or more pieces between the rotor sectors 22A, connecting adjacent rotor sectors 22A, and dividing the spaces between the rotor sectors 22A into two or more unit spaces 24A.

The structure of radially arranging the unit spaces 24A in the spaces between the rotor sectors 22A and using the unit spaces 24A as permanent magnet impregnation spaces, the permanent magnets 2A used herein and their arrangement structure, the structure forming inner and outer steps 25A and 26A, and other configuration of the rotor 20A are the same as or similar to the rotor 20 of the first embodiment, so the detailed description is not provided.

Accordingly, in order to prevent irreversible demagnetization and compensate for output of the electric motor in the second embodiment, it may be possible to impregnate rare-earth permanent magnets at the inner side closer to the stator 10 between the rotor sectors 22A, impregnate ferrite permanent magnets at the outer side, and prepare rare-earth permanent magnets smaller in size than the ferrite permanent magnets or prepare a smaller number of rare-earth permanent magnets than ferrite permanent magnets (that is, the number of the ferrite permanent magnet is larger than the number of the rare-earth permanent magnets).

The frame 40 may be made of stainless steel or aluminum. The inner circumference of the frame 40 may be slightly smaller than the outer circumference of the rotor 20A. Accordingly, when the frame 40 is heated such that the inner circumference of the frame 40 becomes larger than the outer circumference of the rotor 20A, the rotor 20A is inserted into the frame 40 with the inner circumference increased, and it is cooled in this state, whereby the inner circumference of the frame 40 contracts to the initial state, and the rotor 20A is force-fitted into the frame 40 with the inner circumference reduced, so it is firmly and closely combined with the frame 40. In order to cool the heated frame 40, forcible cooling using air or water or common natural cooling may be used.

Referring to FIGS. 4 to 6, one or a plurality of keys 41 is formed axially (toward the rotational center) around inner side of the frame 40 and key grooves 27A where the keys 41 of the frame 40 are fitted are formed around the outer side of the rotor 20A. As shown in FIG. 5, in the second embodiment, adjacent outer steps 26A face each other with a predetermined gap therebetween, so the spaces between the adjacent outer steps 26A function as the key grooves 27A. The frame 40 may have a plurality of keys 41 that are fitted in the key grooves 27A, respectively.

The key grooves 27A are formed slightly smaller in size than the keys 41 of the frame 40. When the frame 40 is thermally force-fitted on the rotor 20A, the keys 41 of the frame 40 are inserted in the key grooves 27A and firmly and closely fitted in the key grooves 27A.

FIGS. 7a to 7d are views showing main parts of an electric motor according to a second embodiment of the present invention. As shown in FIGS. 7a to 7d, the electric motor according to the third embodiment of the present invention is the same as the inner rotor type electric motor according to the first embodiment in terms of all of the configuration and the operation, except that the rotor 200 has a skew structure. The difference is as follows.

The rotor 200 includes a plurality of core plates 201, 202, 203, and 204 constituting a rotor core by being axially stacked. The core plates 201, 202, 203, and 204 include a plurality of sector plates 220 arranged circumferentially with regular intervals around the center and bridges 230 disposed at one or several positions between the sector plates 220 and connecting adjacent sector plates 220. The groups each composed of stacked sector plates 220 constitute a rotor sector (FIGS. 7a to 7d show an example when core plates each have eight sector plates, so eight sector plate groups are provided). Accordingly, the rotor 200 has the entire structure in which the rotor 20 of the first embodiment is divided into a plurality of layers.

The core plates 201, 202, 203, and 204 have unit insertion holes 211, 212, 213, and 214 at the centers, respectively, which constitute a shaft insertion hole 210. Further, a plurality of permanent magnets is circumferentially arranged with regular intervals around each of the unit insertion holes 211, 212, 213, and 214. The permanent magnets and their arrangement are the same as or similar to the first embodiment, so the detailed description is not provided.

At least one key 310 is disposed axially (in the longitudinal direction of the shaft) on the outer side of the outer shaft 400 inserted in the shaft insertion hole 210 and a plurality of key grooves 2710, 272, 273, and 274 where the keys 310 can be fitted is formed around the inner side (unit insertion holes) of the core plates 201, 202, 203, and 204. A plurality of key grooves on one core plate is defined as one group. The key grooves 271, 272, 273, and 274 that make groups are arranged with regular angles α therebetween circumferentially around the core plates 201, 202, 203, and 204.

The number of the keys 310 may be the same as the numbers of the key grooves 271, 272, 273, and 274 of the groups, but in FIGS. 7a to 7d, two keys 310 are arranged at 180 degrees from each other and twenty four key grooves 271, 272, 273, and 274 that make groups are arranged at 15 degrees from each other in four core plates 201, 202, 203, and 204.

The skew structure of the rotor 200 can be configured in this way is described hereafter with reference to FIGS. 7a to 7d.

The four core plates 201, 202, 203, and 204 are fitted on the shaft 300 in stacking order and combined with the shaft 300 by the keys 310 fitted in the key grooves 271, 272, 273, and 274. The core plates 201, 202, 203, and 204 are fitted on the shaft 300 and shifted in one direction by the arrangement angle α (15 degrees) of the key grooves 271, 272, 273, and 274 that make groups, so the core plates 202, 203, and 204 are shifted, respectively, by angles of 1α (15 degrees), 2α (30 degrees), and 3α (45 degrees) with respect to the core plate 201.

Figure 9:
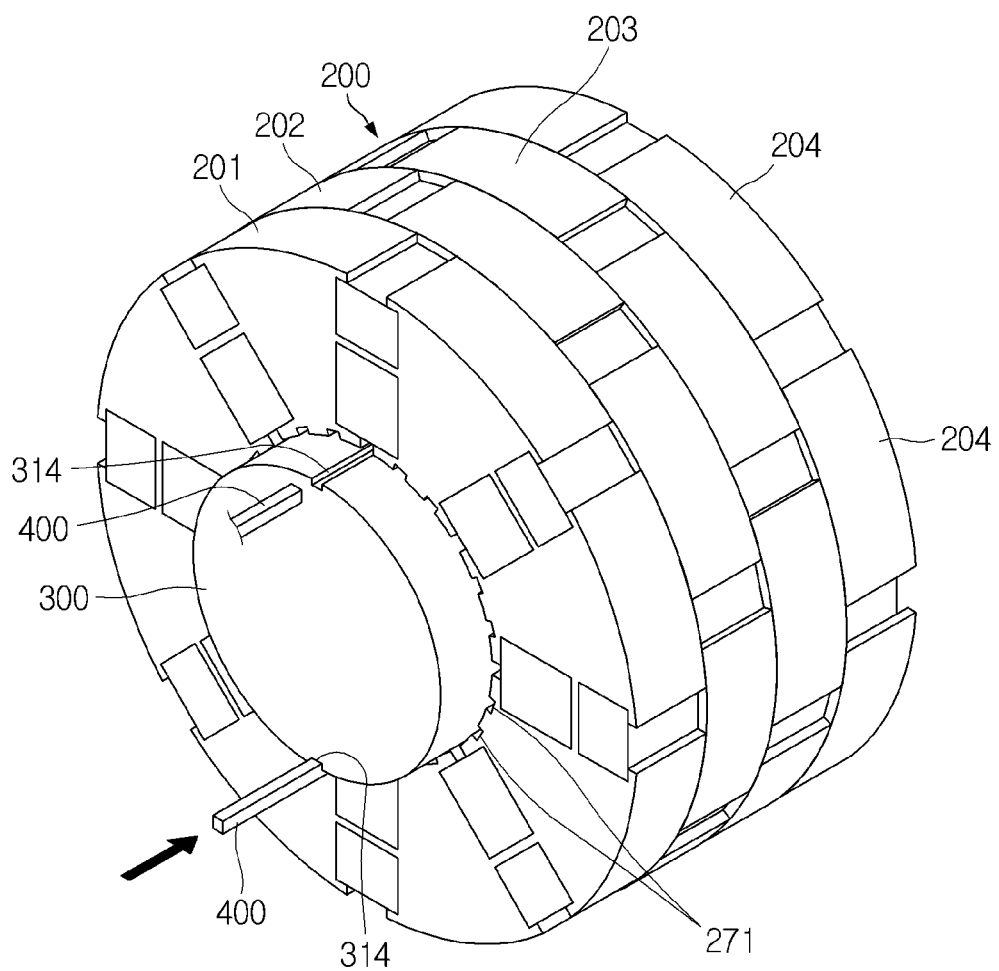
FIG. 9 is a perspective view showing main parts of an electric motor according to a fourth embodiment of the present invention.
Figure 10A:
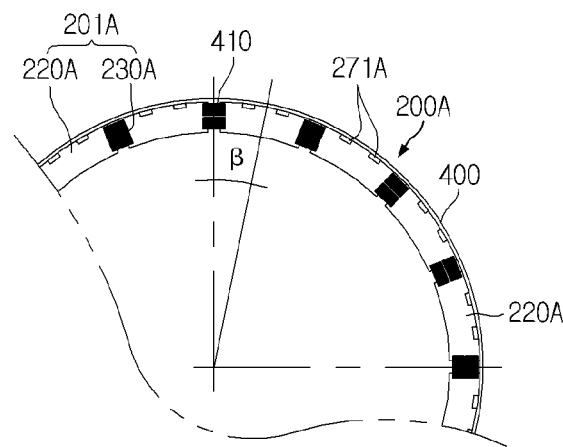
FIGS. 10a to 10d are perspective views showing main parts of an electric motor according to a fifth embodiment of the present invention.
Figure 10B:
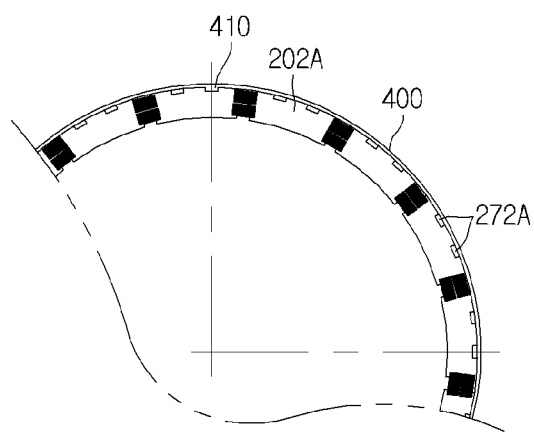
Figure 10C:
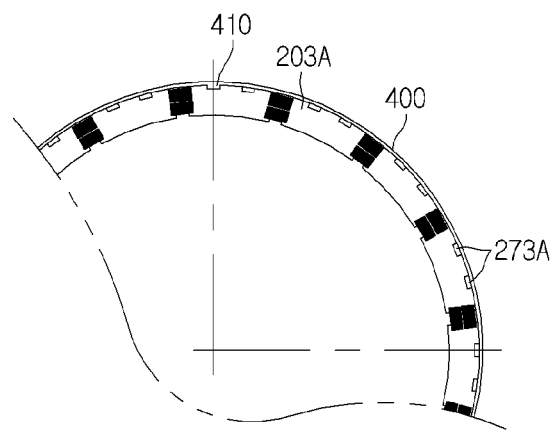
Figure 10D:
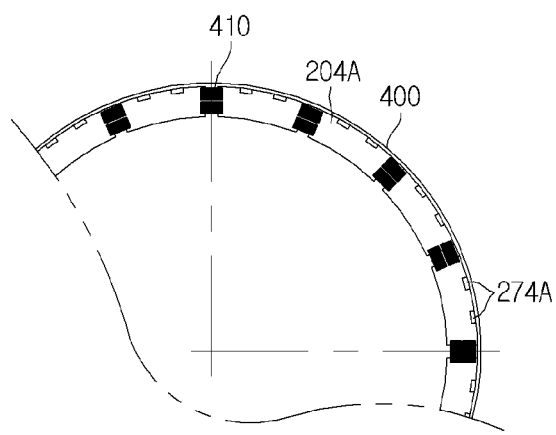

FIG. 9 is a perspective view showing main parts of an electric motor according to a fourth embodiment of the present invention. As shown in FIG. 9, the electric motor according to the present invention is the same as the inner rotor type electric motor according to the third embodiment in terms of all of the configuration and the operation, except that keys 510 are not integrally formed with a shaft, but separately provided.

In the fourth embodiment, since the keys 510 are separately provided, at least one key groove 314 corresponding to the key grooves 271, 272, 273, and 274 making groups of the core plates 201, 202, 203, and 204 is formed on the shaft 300.

FIGS. 10a to 10d are perspective views showing main parts of an electric motor according to a fifth embodiment of the present invention. As shown in FIGS. 10a to 10d, the electric motor according to the fifth embodiment of the present invention is the same as the outer rotor type electric motor according to the second embodiment in terms of all of the configuration and the operation, except that the rotor 200A has a skew structure. This will be described hereafter.

The rotor 200A includes a plurality of core plates 201A, 202A, 203A, and 204A constituting a rotor core by being axially stacked. The core plates 201A, 202A, 203A, and 204A each include a plurality of sector plates 220A circumferentially arranged with regular intervals around the center and bridges 230A disposed at one or several positions between the sector plates 220A and connecting adjacent sector plates 220A. The groups each composed of the stacked sector plates 220A constitute the rotor sector. Accordingly, the rotor 200A has the entire structure in which the rotor 20A of the second embodiment is divided into a plurality of layers.

At least one key 410 is axially formed on the inner side of the frame 400 disposed outside the rotor 200A and a plurality of key grooves 271A, 272A, 273A, and 274A, where the key 410 of the frame 400 can be fitted, is formed around the outer side of the core plates 201A, 202A, 203A, and 204A, respectively. When a plurality of key grooves on one core plate is defined as a group, the key grooves 271A, 272A, 273A, and 274A in the groups are all arranged with regular angles β circumferentially around the core plates 201A, 202A, 203A, and 204A.

The number of the keys 410 may be the same as the numbers of the key grooves 271A, 272A, 273A, and 274A of the groups, but in FIGS. 10a to 10d, two keys 410 are arranged at 180 degrees from each other and twenty four key grooves 271A, 272A, 273A, and 274A that make groups are arranged at 7.5 degrees from each other in four core plates 201A, 202A, 203A, and 204A.

The skew structure of the rotor 200A can be configured in this way is described hereafter with reference to FIGS. 10a to 10d.

The four core plates 201A, 202A, 203A, and 204A are fitted in the frame 400 in the stacking order and combined with the frame 400 by the keys 410 fitted in the key grooves 271A, 272A, 273A, and 274A. The core plates 201A, 202A, 203A, and 204A are fitted in the frame 400 and shifted by arrangement angles β (7.5 degrees) of the key grooves 271A, 272A, 273A, and 274A making the groups, so the core plates 202A, 203A, and 204A are shifted, respectively, by angles of 1β (7.5 degrees), 2β (15 degrees), and 3β (22.5 degrees) with respect to the core plate 201A.

In the fifth embodiment, keys may be separately provided, similar to the fourth embodiment. That is, a combination for a skew structure is achieved by not integrally forming keys with the frame 400, but separately providing keys and forming at least one key groove corresponding to the key grooves 271A, 272A, 273A, and 274A making groups of the core plates 201A, 202A, 203A, and 204A on the frame 400.

Although the present invention was described above, the present invention is not limited to the embodiments described herein and the accompanying drawings and may be modified in various ways by those skilled in the art without departing from the scope of the present invention.

The invention claimed is:

1. An inner rotor type electric motor, comprising:
a stator having a plurality of teeth that are circumferentially arranged and on which a coil is wound;
a rotor disposed inside the stator to be able to rotate relative to the stator, having a plurality of permanent magnets circumferentially arranged, and having a shaft insertion hole at a center; and
a non-magnetic shaft thermally force-fitted in the shaft insertion hole of the rotor and rotating with the rotor, said shaft being circular in cross-section,
wherein the rotor includes:
a plurality of rotor sectors defining the shaft insertion hole by being circumferentially arranged with predetermined intervals around the center;
bridges connecting the adjacent rotor sectors to each other by being inserted at one or several positions between the rotor sectors, and
the rotor sectors have inner steps protruding and facing each other at inner ends on both sides that are adjacent to and face each other via gaps,
so the shaft insertion hole increases in size when heat is applied for thermal force-fitting.

2. The inner rotor type electric motor of claim 1, wherein one or a plurality of keys are axially formed around an outer side of the shaft, and
key grooves where the keys are fitted are formed around an inner side of the shaft insertion hole.

3. The inner rotor type electric motor of claim 1, wherein the bridges divide spaces between the rotor sectors into two or more unit spaces, and
the permanent magnets are received in the unit spaces, respectively, so the unit spaces may be permanent magnet impregnation spaces.

4. The inner rotor type electric motor of claim 3, wherein the bridges divide the spaces between the rotor sectors such that two or more permanent magnet impregnation spaces are radially arranged between the rotor sectors, and
the rotor sectors have outer steps protruding and facing each other at outer ends on both sides that are adjacent to and face each other via gaps.

5. The inner rotor type electric motor of claim 4, wherein keys fitted in spaces between the inner steps facing each other are formed around the outer side of the shaft and the spaces between the inner steps are key grooves.

6. The inner rotor type electric motor of claim 1, wherein the rotor includes a plurality of core plates constituting a rotor core by being axially stacked, the core plates each include a plurality of sector plates circumferentially arranged with predetermined intervals around the center and the bridges connecting the sector plates between the sector plate, and groups of the stacked sector plates constitute the rotor sector.

7. The inner rotor type electric motor of claim 6, wherein a plurality of axially formed first key grooves is circumferentially arranged with regular intervals around one of inner sides of the core plates or the outer side of the shaft and at least one second key groove corresponding to the first key grooves is formed on the other one,
the core plates are shifted in one direction in stacking order by circumferential gaps between the first key grooves such that the first key grooves coincide with the second key groove, and are fitted on the shaft,
keys are fitted in the coinciding first key grooves and second key grooves, and
the core plates are combined with the shaft in a skew structure.

8. An inner rotor type electric motor, comprising:
a stator having a plurality of teeth that are circumferentially arranged and on which a coil is wound;
a rotor disposed inside the stator to be able to rotate relative to the stator, having a plurality of permanent magnets circumferentially arranged, and having a shaft insertion hole at a center; and
a non-magnetic shaft thermally force-fitted in the shaft insertion hole of the rotor and rotating with the rotor,
wherein the rotor includes:
a plurality of rotor sectors defining the shaft insertion hole by being circumferentially arranged with predetermined intervals around the center; and
bridges connecting the adjacent rotor sectors to each other by being inserted at one or several positions between the rotor sectors,
so the shaft insertion hole increases in size when heat is applied for thermal force-fitting,
wherein the bridges divide the spaces between the rotor sectors into three or more unit spaces and the three or more unit spaces between the rotor sectors are radially arranged,
the permanent magnets are received in the unit spaces, respectively, and the unit spaces are permanent magnet impregnation spaces,
the permanent magnets include ferrite permanent magnets impregnated in inner permanent magnet impregnation spaces between the rotor sectors and rare-earth permanent magnets impregnated in outer permanent magnet impregnation spaces, and
the number of the ferrite permanent magnets is larger than the number of the rare-earth permanent magnets in the permanent magnets between the rotor sectors.

* * * * *